Figure 4:
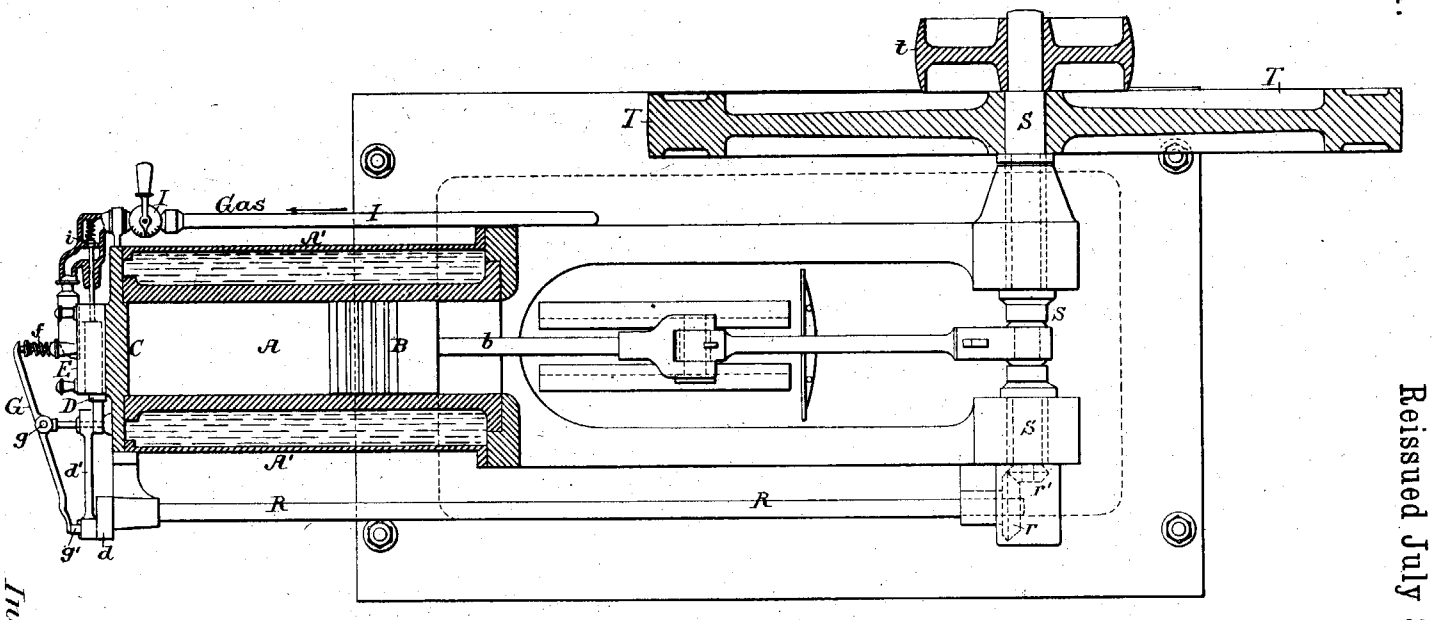

3 Sheets—Sheet 1.
E. DELAMARE-DEBOUTTEVILLE & L. P. C. MALANDIN.
GAS ENGINE.
No. 10,951. Reissued July 31, 1888.
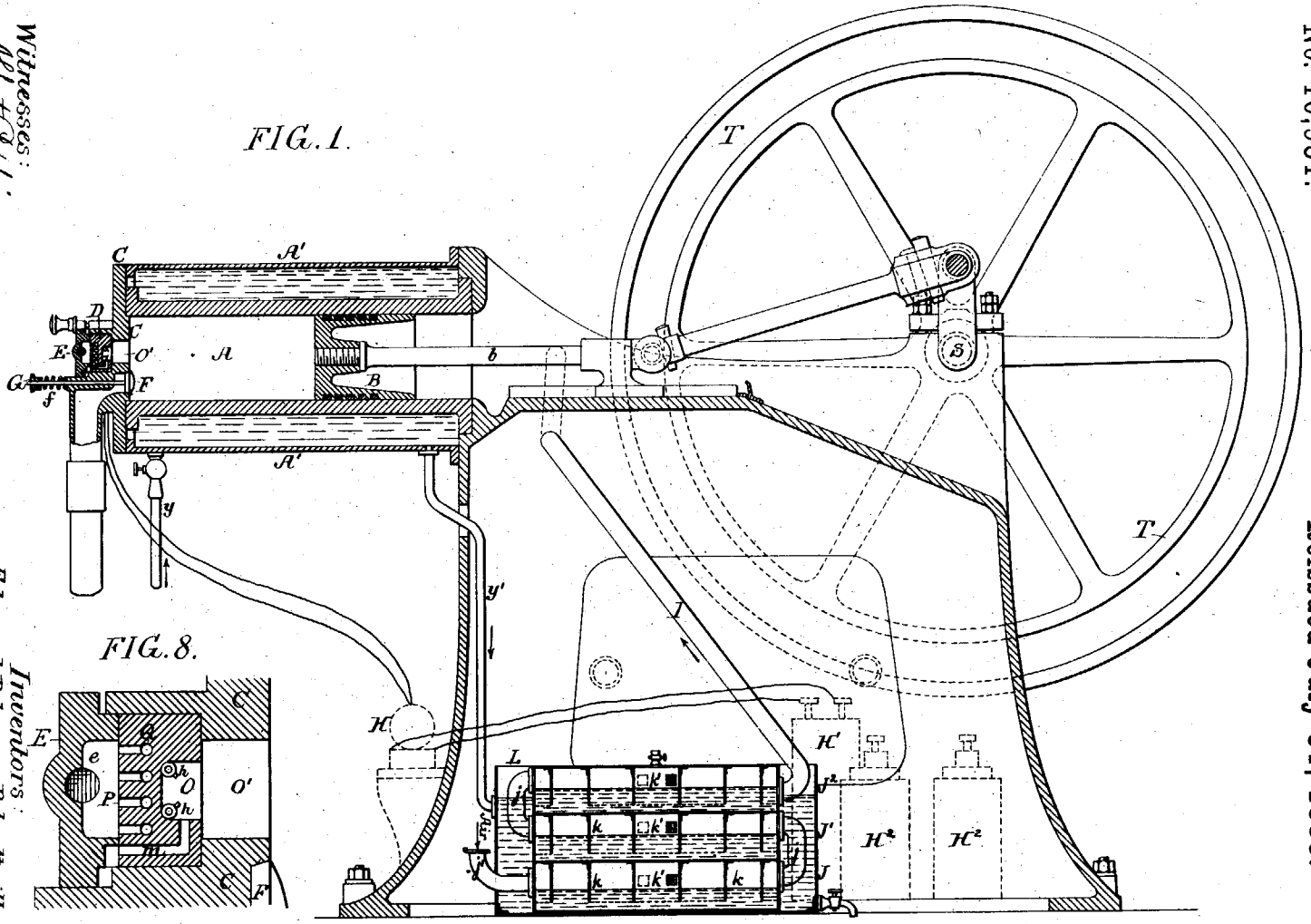
Witnesses:
Albert Popkins
Jas. L. Skidmore
Inventors:
Edouard Delamare-Deboutteville &
Leon Paul Charles Malandin
by their Attorneys
Howson & Sons 3 Sheets—Sheet 2.
E. DELAMARE-DEBOUTTEVILLE & L. P. C. MALANDIN.
GAS ENGINE.
No. 10,951. Reissued July 31, 1888.
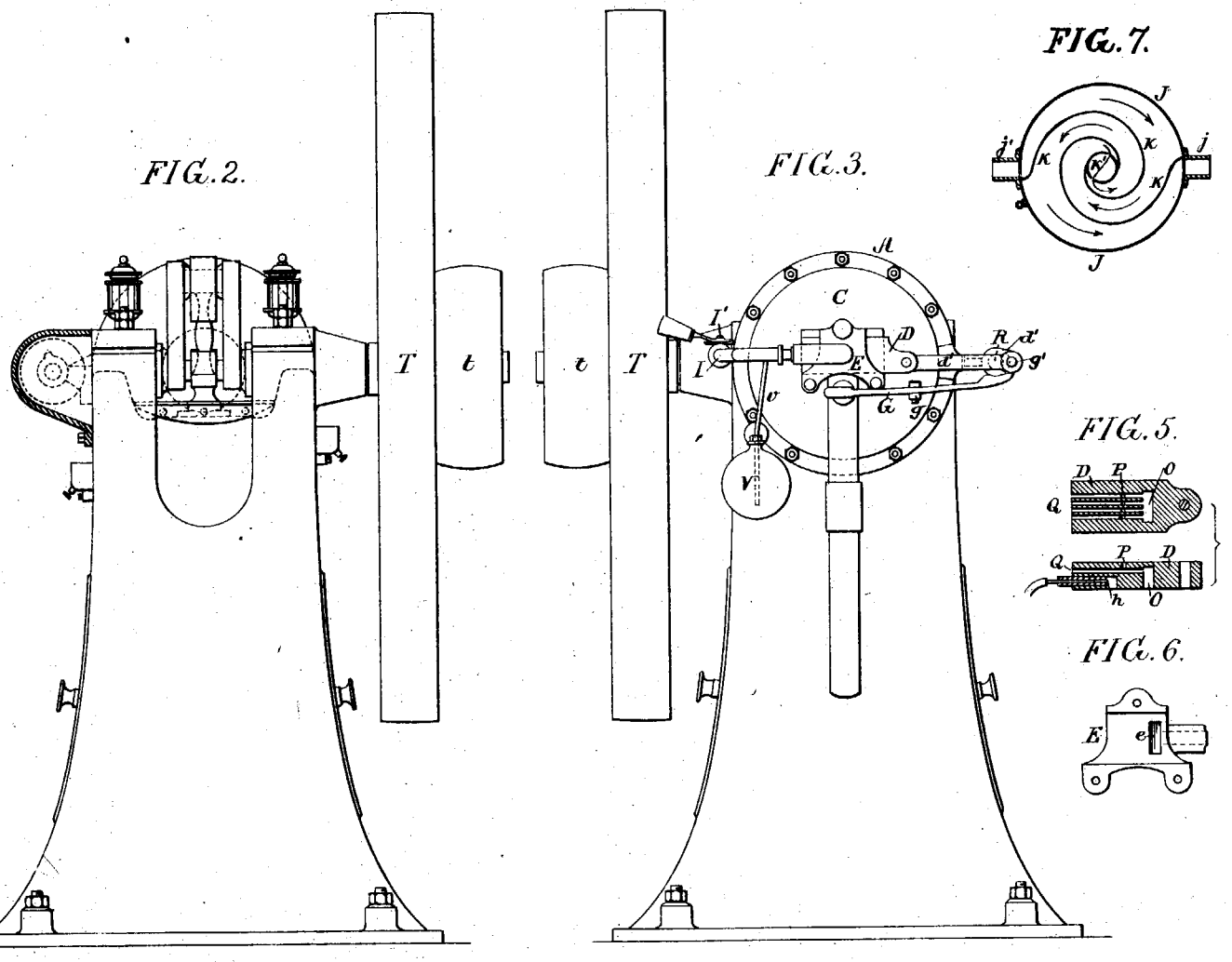
Witnesses:
Albert Popkins
Jas. L. Skidmore.
Inventors:
Edouard Delamare-Deboutteville &
Leon Paul Charles Malandin,
by their Attorneys
Howson & Sons.

3 Sheets—Sheet 3

E. DELAMARE-DEBOUTTEVILLE & L. P. C. MALANDIN.

GAS ENGINE.

No. 10,951. Reissued July 31, 1888.

Witnesses:
Albert Popkins.
Jas. L. Skidmore.

Inventors:
Edouard Delamare-Deboutteville &
Leon Paul Charles Malandin,
by their Attorneys.
Howson & Sons.

UNITED STATES PATENT OFFICE.

EDOUARD DELAMARE-DEBOUTTEVILLE AND LÉON PAUL CHARLES MALANDIN, OF FONTAINE-LE-BOURG, SEINE-INFÉRIEURE, FRANCE.

GAS-ENGINE.

SPECIFICATION forming part of Reissued Letters Patent No. 10,951, dated July 31, 1888.

Original No. 333,838, dated January 5, 1886. Application for reissue filed October 21, 1887. Serial No. 253,043. Patented in France February 12, 1884, No. 160,267; in Belgium February 23, 1884, No. 64,253; in England February 26, 1884, No. 3,986; in Germany March 4, 1884, No. 33,915; in Italy March 20, 1884, No. 76,607; in Russia April 2, 1884; in Spain May 28, 1884, No. 5,579, and in Austria-Hungary August 29, 1884, No. 8,721.

*To all whom it may concern:*

Be it known that we, EDOUARD DELAMARE-DEBOUTTEVILLE and LÉON PAUL CHARLES MALANDIN, both citizens of the Republic of France, and residing in Fontaine-le-Bourg, (Seine-Inférieure,) France, have invented certain Improvements in Gas-Engines, (for which we have obtained Letters Patent in France, No. 160,267, February 12, 1884; Great Britain, No. 3,986, February 26, 1884; Austria, No. 8,721, August 29, 1884; Germany, No. 33,915, March 4, 1884; Belgium, No. 64,253, February 23, 1884; Spain, No. 5,579, May 28, 1884; Italy, No. 76,607, March 20, 1884, and Russia, April 2, 1884,) of which the following is a specification.

Our invention consists of certain improvements in the construction of gas-engines, designed more particularly with the view of increasing their simplicity and lightness and facilitating the ignition of the explosive gas by electricity.

In the accompanying drawings, Figure 1 is a vertical section of our improved gas-engine. Fig. 2 is an end elevation at the crank-shaft end of the machine. Fig. 3 is a view of the opposite end of the engine. Fig. 4 is a sectional plan view. Fig. 5 illustrates in section the sliding valve. Fig. 6 is an inside view of the cover of the slide detached. Fig. 7 is a sectional plan view of a construction of carburetor which we prefer to use in connection with the engine; and Fig. 8 is a sectional view of the ignition end of the cylinder, drawn to an enlarged scale.

A is the working-cylinder, which we prefer to inclose in a water-jacket, A′, provided with an inlet-pipe, *y*, and an outlet-pipe, *y′*, for the circulation of the water. In this cylinder A works the piston B, provided with a suitable number of packing-rings and having its rod *b* connected to the crank-shaft S, on the outer end of which is the usual fly-wheel, T, and belt-pulley *t*. The outer end of the cylinder A is closed by the head C, to which is adapted the transverse sliding valve D, inclosed by the cover E. As shown in Fig. 4, this sliding valve is controlled by the crank *d* on the longitudinal rod R, through the medium of the connecting-rod *d′*. This rod or shaft R receives a continuous rotary motion from the crank-shaft S through the medium of bevel-gearing *r r′*, Fig. 4.

The construction of the sliding valve D is illustrated more fully in Fig. 5, from which it will be seen that it is provided with a series of longitudinal openings, Q, for the admission of air, and opening into these passages Q are transverse openings P for the admission of gas through the opening or port *e* of the cover E, Fig. 6. The gaseous mixture then passes through the common opening or port O in the slide, and the chamber O′ in the head of the cylinder into the interior of the latter, when the slide is in the proper position for that purpose. The slide D also carries two insulated igniting-points, *h*, for producing the electric spark, these points being the terminals of an induction apparatus, H, as shown by dotted lines in Fig. 1, receiving continuous current from an accumulator, H′, charged by batteries H² or by a dynamo, in any well-known way. We provide the igniting-chamber with a small orifice or outlet, *m*, which, when compression takes place within the cylinder by the movement of the piston, allows the compressed gases in the cylinder to expel the burned gas from said igniting-chamber, the outlet being open to the atmosphere when the said chamber is open to the cylinder.

In the cylinder-head, immediately below the igniting-chamber O′, is the exhaust-port, controlled by a valve, F, which is to be opened inwardly by a positive motion, it being kept to its seat by a spring, *f*. On the stem of the valve bears a lever, G, Fig. 4, pivoted at *g* and having its opposite arm within the path of a tappet, *g′*, on the crank *d* of the shaft R, so that at each complete revolution of the shaft R the lever G will be so operated as to open the valve F and allow the products of combustion to be discharged through the exhaust-port. The gas enters through a supply-pipe, I, controlled by the hand-valve I′, Figs. 3 and 4, and by the spring-valve *i*, Fig. 4, which is opened at each movement of the slide D by the end of the latter striking against the stem of the valve, so as to admit the gas to the slide at the proper time.

For gas we may use either ordinary illuminating-gas, hydrogen gas mixed with carbonic oxide and illuminating-gas, or the gas produced by the passing of a current of air over hydrocarbon in a suitable carburetor. In Figs. 1 and 7 we have illustrated the form of carburetor which may be used for this purpose. In Fig. 1 it is shown as consisting of three sections, J, J', and J², connected with each other through pipes *j*, and having the inlet for the air at *j'*. Each section or chamber contains, depending from the top to within a distance from the bottom, a double spiral coil or plate, *k*, which forms two spiral passages communicating with each other through the central chamber, *k'*, and the section being filled with hydrocarbon to a point above the lower end of these double spiral plates, the air is compelled to take a long circuitous course in contact with the hydrocarbon before passing out into the pipe I, by which the carbureted gas is supplied to the cylinder.

If desired, the passages in the sections of the carburetor may be provided with some porous substance—such as pumice-stone, sponge, and the like—to present a more extended surface of hydrocarbon for contact with the air. We do not limit ourselves, however, to the use of any particular construction of carburetor. It is desirable to inclose it within a tank, L, to which is supplied the more or less heated water, which is received through the pipe *y'* from the water-jacket of the cylinder. The gas coming through the pipe *l* is allowed to pass by the opening of the valve *i* into the passage *e* in the cover E, and at the proper moment the openings P in the slide D coincide with this passage *e*, so as to admit the gas to the port P, Fig. 5, to which air at the same time has been admitted through the openings Q. The continued movement of the slide D then allows the mixture of air and gas to enter the chamber O' to ignite the explosive mixture by the continuous spark produced by the induction apparatus H. A small outlet or orifice, *m*, in the slide allows the compressed gases in the cylinder to expel the burned gases left in the igniting-chamber O' from the previous explosion. Thus there is a direct ignition of the gaseous mixture by the electric spark under the control of the slide, for the only communication between the electric igniting device and the interior of the cylinder is the direct communication through the igniting-chamber O' when the slide comes into the proper position. When the piston has completed its outward stroke, due to the explosion above described, it returns and makes another inward stroke under the action of the fly-wheel and compresses the gaseous mixture which it previously drew in. After the explosion has taken place again the piston, after another outward stroke, returns, owing to the momentum of the fly-wheel, and expels the products of combustion through the exhaust-port, the valve F of which is opened just before the piston commences to return. The gases are discharged directly into the atmosphere or through a suitable device for producing silent discharge. The valve F is then momentarily closed again, and remains closed during the introduction, compression, and explosion of the next supply of gaseous mixture.

We prefer to combine with the engine a lubricator, which in this case is shown as consisting of a vessel, V, Fig. 3, containing the lubricating-fluid and having a small tube, *v*, leading up into the inlet-pipe I, so that on the outward stroke of the piston, when it draws in the gas and air, a certain amount of lubricating-fluid will be exhausted or drawn by the vacuum from the vessel V to lubricate the slide and piston.

Instead of employing points to produce an electric spark to ignite the gas, the induction apparatus may be dispensed with and a platinum or other fine wire used in connection with an electric generator to ignite the gas by its incandescence.

We claim as our invention—

1. The combination of the cylinder and piston of a gas-engine with the head C, having a chamber, O', and a slide, D, provided with a series of longitudinal air-openings, Q, transverse gas-passages P, and port O.

2. The combination of the cylinder and piston of a gas-engine with a gas-supply pipe, I, having a spring-valve, *i*, and a separate slide-valve, D, carrying the air and gas passages and adapted to come into contact with the said valve to open the same periodically, substantially as set forth.

3. A gas-engine provided with an electric igniting device and a slide having a small outlet from the igniting-chamber to the atmosphere when the said chamber is open to the cylinder, whereby the burned gas therein may be expelled by the compressed gases in the cylinder, substantially as described.

4. A gas-engine having an electrical igniting device, a regulating-slide, and an igniting-chamber forming the only communication between the electrical igniting device and the cylinder for the direct ignition by the electrical igniting device of the gases in the cylinder under the control of the slide, which has an outlet from the igniting chamber for expelling the burned gases, all substantially as set forth.

In witness whereof we have hereunto set our hands in presence of two subscribing witnesses.

EDOUARD DELAMARE-DEBOUTTEVILLE.
LÉON PAUL CHARLES MALANDIN.

Witnesses:
E. BENDERITS, Fils,
C. E. VEZANBRE.